July 28, 1964
E. G. FLINT
3,142,350
MOTOR VEHICLE PARKING DEVICE MOUNTED ON
REAR AXLE DIFFERENTIAL CASING
Filed Sept. 15, 1959
2 Sheets-Sheet 1
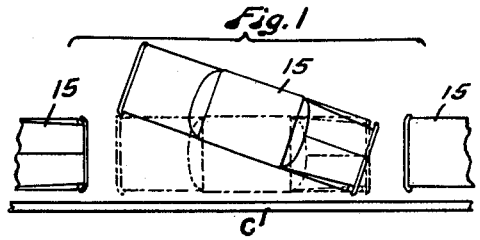
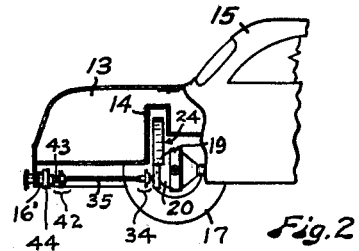
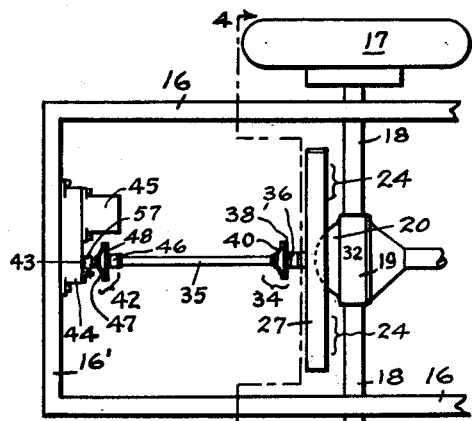
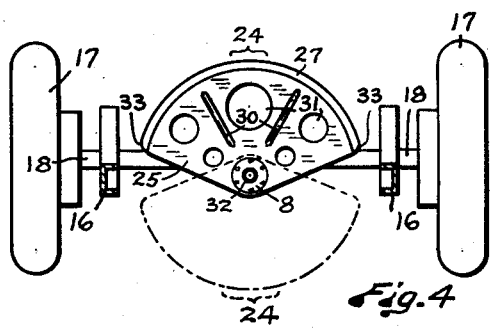
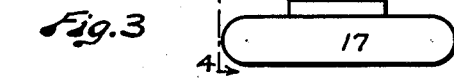
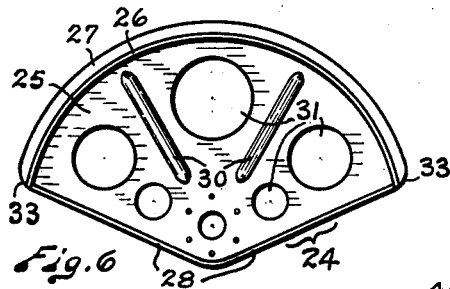
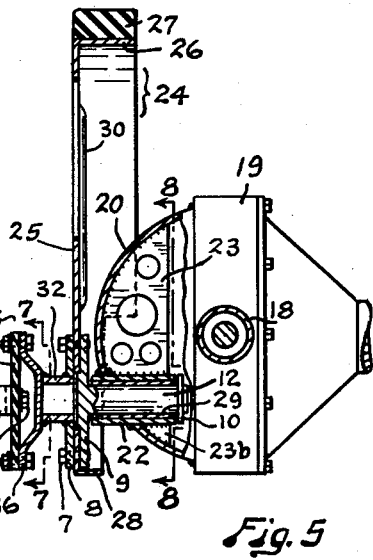
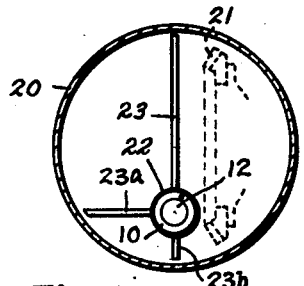
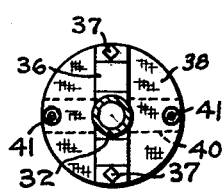
INVENTOR.
Ellis G. Flint
BY
Fred C. Matheny
ATTORNEY July 28, 1964
E. G. FLINT
3,142,350
MOTOR VEHICLE PARKING DEVICE MOUNTED ON
REAR AXLE DIFFERENTIAL CASING
Filed Sept. 15, 1959
2 Sheets-Sheet 2
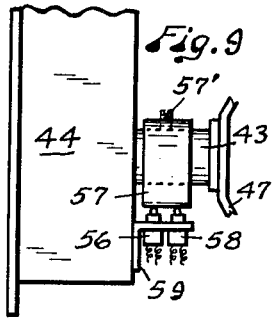
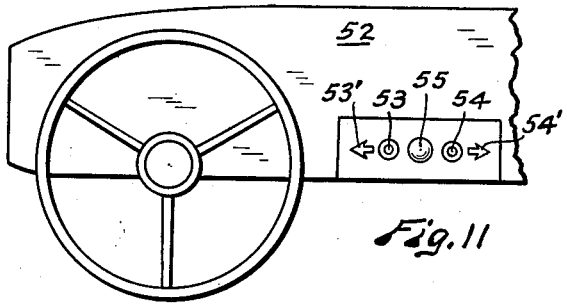
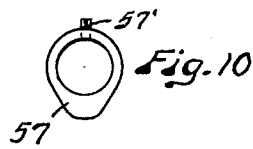
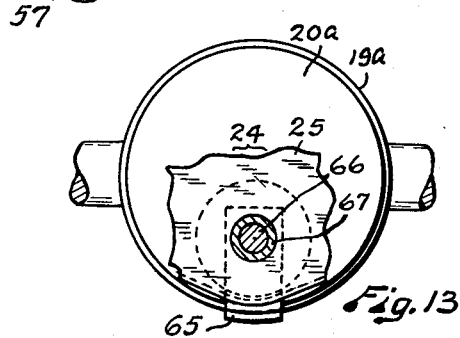
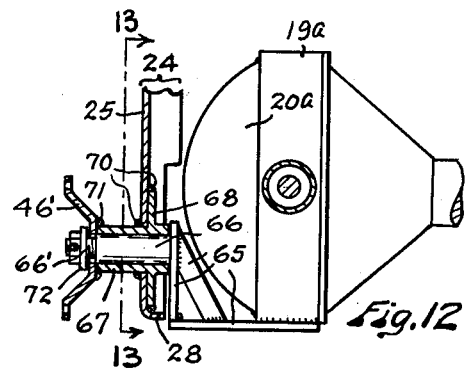
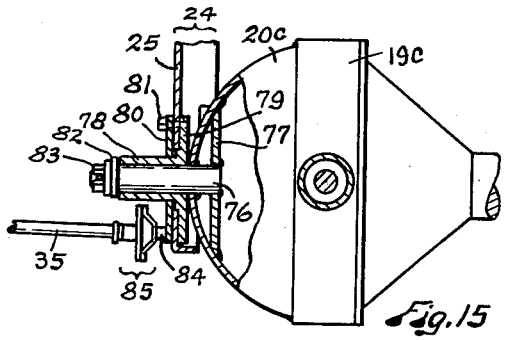
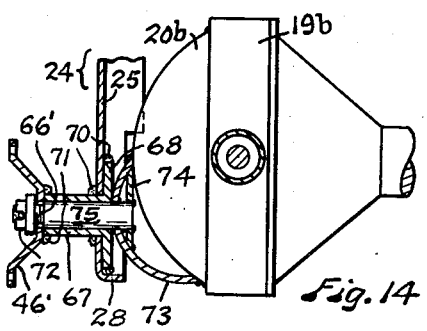
INVENTOR.
Ellis G. Flint
BY
Fred C. Matheny
ATTORNEY

United States Patent Office 3,142,350
Patented July 28, 1964

3,142,350
MOTOR VEHICLE PARKING DEVICE MOUNTED
ON REAR AXLE DIFFERENTIAL CASING
Ellis G. Flint, Doland, S. Dak.
Filed Sept. 15, 1959, Ser. No. 840,064
6 Claims. (Cl. 180—1)

My invention relates to a motor vehicle parking device and an object of my invention is to provide an efficient device adapted to be installed on a motor vehicle and capable of being operated to move one end portion of said vehicle transversely into or out of a parking place between two other vehicles and alongside of a curb, thereby saving space, time and effort in parking.

Another object is to provide a parking device which is particularly well adapted for use on present day automobiles in which the frame and body overhang and extend rearwardly beyond the rear axle a substantial distance.

Another object is to provide a parking device which does not require the addition of much weight to the unsprung parts of a motor vehicle on which it is installed and in which much of the weight of the device, particularly the source of power for operating said parking device, is carried by parts that are spring supported.

Another object is to provide a parking device which can be used to lift the rear end portion of a vehicle on which it is carried, thereby facilitating changing rear tires, putting on tire chains and like services which require jacking up or lifting the rear wheels of a vehicle.

Another object is to provide a parking device of this nature in which a wheel sector used in lifting the rear end portion of a motor vehicle is mounted on and carried by the enlarged medial part of the rear axle housing in which the differential gear assembly is disposed, said enlarged medial housing part being hereinafter referred to as the differential gear housing.

Another object is to provide a light weight but strong and rugged wheel sector which is particularly well adapted for use as a part of my parking device.

Further objects are to provide a parking device which makes it possible to park a motor vehicle in a smaller space than is normally required when parking alongside of a curb, thus making it possible to park more automobiles on the streets of a predetermined area and which further makes it easier to park in heavy traffic and enables a driver to turn a vehicle one hundred eighty degrees or more within a space only slightly greater in diameter than the length of the vehicle.

Other objects are to provide a parking device of this nature which is strong and rugged but simple in construction, light in weight, efficient in operation, easily installed on present day automobiles without extensive and costly alterations but which is also adapted to be incorporated in the automobile at the time of construction, and to provide a parking device which does not reduce or impair the road clearance of the vehicle on which it is installed.

In a general way my invention consists in rotatively mounting a power driven sector or segment of a wheel on the rear end portion of a motor vehicle, preferably on the enlarged medial portion of the rear axle housing herein referred to as the differential gear housing, with the wheel sector disposed in a plane transverse to the vehicle and supported for rotation on an axis positioned midway between the two sides of the vehicle for proper balance and at a predetermined distances above the roadbed so that the wheel sector, when in its uppermost position, will not impair the road clearance of the vehicle but when said wheel sector is rotatively driven it will engage with the roadbed and lift and transversely move the rear end portion of the vehicle.

Other objects of my invention will be apparent from the following description and accompanying drawings.

FIGURE 1 is a diagrammatic plan view illustrating the operation of my parking device.

FIG. 2 is a fragmentary view partly in side elevation and partly in section showing by parking device installed on a conventional automobile with rear end drive.

FIG. 3 is a plan view, on a larger scale than FIG. 2, showing parts of the rear end portion of an automobile having my parking device installed thereon.

FIG. 4 is an end view with parts in section looking in the direction indicated by broken line 4—4 of FIG. 3.

FIG. 5 is a sectional view, with parts in side elevation, showing my parking device attached to the differential gear housing of a motor vehicle.

FIG. 6 is a detached view in elevation of a wheel sector, showing the concave or front side of the same.

FIG. 7 is a view partly in section and partly in elevation looking in the direction indicated by broken line 7—7 of FIG. 5 and showing a universal joint.

FIG. 8 is a view partly in section and partly in elevation taken substantially on broken line 8—8 of FIG. 5.

FIG. 9 is a fragmentary plan view showing part of a gear housing and showing switches and a cam for operating said switches.

FIG. 10 is a detached elevational view of the switch operating cam shown in FIG. 9.

FIG. 11 is a fragmentary elevational view showing manually operated control switches and indicator means for my parking device.

FIG. 12 is a fragmentary side elevational view, with parts in section, showing modified means which can be used in connection with my invention for mounting a wheel sector on the differential gear housing of a motor vehicle.

FIG. 13 is a view in elevation, with parts in section, looking in the direction indicated by broken line 13—13 of FIG. 12.

FIG. 14 is a fragmentary view partly in side elevation and partly in section showing other modified means which can be used in accordance with my invention for mounting a wheel sector on the differential gear housing of a motor vehicle.

FIG. 15 is a view partly in section and partly in elevation showing still another modified means which can be used in accordance with my invention for mounting a wheel sector on the differential gear housing of a motor vehicle, together with off-center driving means for driving said wheel sector.

Like reference numerals refer to like parts throughout the several views.

The drawings show my parking device applied to an automobile which includes a body 15, a frame 16, rear wheels 17, a rear axle housing 18 and a differential gear housing 19 in the form of a medially positioned enlargement of the axle housing 18. The frame 16 is spring supported in any conventional manner and said frame 16 overhangs and extends rearwardly a substantial distance from the axle housing 18 and has a transverse rear end bar 16′.

In the form of my invention illustrated in FIGS. 1 to 11 the differential housing 19 has a spherically shaped cap or rear side member 20 which is welded or otherwise rigidly attached to the housing 19. In some instances the cap 20 may be a conventional part of the differential gear housing. In other instances it may be of special construction and made in accordance with my invention. In differential gear assemblies of the type commonly in use a ring gear 21, indicated by dotted lines in FIG. 8, is positioned to one side of the longitudinal medial vertical plane of the differential gear housing 19. This leaves some unused space within the lower portion of the ordinary differential gear housing and to the right of the ring gear 21. In the form of my invention shown in FIGS. 5 and 8 I utilize this space by positioning therein a horizontal bearing tube 22 which extends through the wall of the cap 20 and is welded thereto. Within the cap 20 preferably three webs 23, 23a and 23b are provided to strengthen and support the bearing tube 22. Each of these webs is welded to the cap 20 and to the bearing tube 22. A bushing 29 is disposed within the bearing tube 22 and a shaft 12 is rotatively received within said bushing 29. A snap ring 10 is provided on the inner end of the shaft 12 to retain said shaft in the tube 22 and the outer end of said shaft 12 is provided with a disc shaped flange 9. The differential housing 19, 20 ordinarily contains lubricant and this insures proper lubrication of shaft 12 at all times.

A wheel sector, referred to generally by numeral 24, is secured to the flange 9, preferably by a flat ring 8 and cap screws 7. The wheel sector 24 is thus rigidly connected with and supported from the shaft 12. The wheel sector 24 is positioned close to the cap 20 of the differential gear housing 19 and to the rear of said housing. The shaft 12 which carries the wheel sector 24 is in the longitudinal medial vertical plane of the housing 19 and below the axis of said housing.

A suitable compartment 14, FIG. 2, for the wheel sector 24 is provided in the trunk 13 of the automobile body 15. This compartment 14 does not objectionably decrease or obstruct the trunk space.

The construction of the wheel sector 24 can be varied. I prefer to form this wheel sector 24 of a metal plate 25 having its peripheral portion bent at right angles forming a rim 26 of less than a semi-circle upon which a tire or tread 27 is cemented or otherwise securely attached. The peripheral portion of the tire or tread 27 is preferably of non-skid design to best resist slippage on wet pavement, snow, ice or slopes. The edge portions of the plate 25 opposite to the rim 26 are bent at right angles to form marginal flanges 28 of less depth than the rim 26. These flanges 28 reinforce the plate 25 and give it greater strength to resist transverse strains. Also preferably said plate 25 has radial corrugations or stiffening ribs 30 pressed or stamped therein for reinforcing purposes. Parts of the plate 25 where strength is not needed are cut away to leave holes 31 and thereby reduce the weight of said plate. This provides a light weight wheel sector of some resiliency which is strong and not easily bent and which does not add substantial weight to the part of my parking device which is carried on the unsprung part of the vehicle. Preferably the end portions of the tire 27 are rounded as indicated by 33 in FIGS. 4 and 6 so they will act like cams in engaging the roadbed and starting the lift of the rear end portion of the vehicle.

A short tube 32 is welded or otherwise rigidly attached to the clamping plate 8 in coaxial alignment with the shaft 12 and extends rearwardly from said plate 8. Thus the short tube 32 is rigidly attached to the wheel sector 24. A universal joint, indicated generally by 34 connects the short tube 32 with a tubular drive shaft 35 by which the wheel sector 24 is driven. The universal joint 34 consists of a bracket 36 welded or otherwise rigidly secured to the end of the short tube 32 remote from the plate 8. The opposite ends of the bracket member 36 are secured by bolts 37 to the peripheral portion of a flexible disc 38. The disc 38 may be heavy but flexible rubberized fabric or cord construction like the material used in the side walls of pneumatic tires. Another bracket 40, similar to bracket 36, is positioned at right angles to said bracket 36 and has its end portions secured by bolts 41, FIG. 7, to the flexible disc 38 at points ninety degrees removed from the points of connection of the bracket 36 with said disc 38. The bracket 40 is rigidly connected with the tubular drive shaft 35. Preferably this connection is made by welding the bracket 40 to a plate 39 which is welded to the end of the drive shaft 35. Both of the brackets 36 and 40 are dish shaped when viewed in side elevation and are bowed away from the disc 38 so that only the end portions of said brackets engage with said disc. The drive shaft 35, FIG. 3, extends rearwardly from the universal joint 34 and is connected by another universal joint 42 with the shaft 43 of a speed reduction gear in a housing 44. A reversible motor 45, preferably electric and capable of being operated by the battery of the vehicle carrying this device, but which can be replaced by a hydraulic motor, is connected with the speed reduction gear in housing 44 for driving purposes. It is to be noted that the power unit including motor 45 and transmission 44 is mounted on a spring supported part of the vehicle.

The universal joint 42 is similar to the universal joint 34 and comprises two bracket members 46 and 47 disposed at right angles to each other and each connected with the peripheral portions of a flexible disc 48. Each universal joint 34 and 42 provides the required universal driving torque connection and at the same time allows for a reasonable amount of variation in the distance between the driving member 43 and the driven member including short tube 32, wheel sector 24 and shaft 12. This distance variation occurs because the driving member 43 is mounted on a spring supported part and the driven members on an unsprung part of the vehicle.

The reversible electric motor 45 is preferably controlled by two normally open switches 53 and 54, FIG. 11, on the dash 52 of the vehicle. Switches 53 and 54 can be of push button type. The closing of switch 53 will operate the motor 45 in one direction and the closing of switch 54 will operate said motor in the opposite direction. A signal lamp 55, preferably colored, is provided between the switches 53 and 54. Lamp 55 indicates to the driver whether the wheel sector 24 is in the raised and inoperative position, shown by full lines in FIGS. 4 and 5, or is in a lowered or partly lowered position, such as the position shown by dot and dash lines in FIG. 4. Preferably the signal lamp 55 is connected in parallel with the armature of the motor 45 and in series with a normally open cam operated switch 56, FIG. 9. The switch 56 is positioned so that it will be engaged and closed by a cam 57, which is preferably on motor driven shaft 43, only when the wheel sector 24 is in the raised and inoperative position. Thus if the wheel sector 24 is in any position except the fully raised position the signal lamp 55 will be "off" or not lighted and this will warn the driver that the sector wheel 24 is not in a proper position for driving the vehicle. Also lighting of the signal lamp 55 indicates to the driver the correct time to release either switch 53 or switch 54 when he is operating the wheel sector 24. If desired a second normally open switch 58 may be positioned alongside of the switch 56 for operation by the cam 57. This second switch 58 is connected in series with the ignition switch which controls the supply of ignition current to the motor of the vehicle and this makes it impossible to start or operate the motor of the vehicle unless the wheel sector 24 is in the proper inoperative or raised position and the cam 57 is holding the switch 58 closed. The switches 56 and 58 are herein shown as mounted by a bracket 59 on the gear housing 44. A set screw 57' secures the cam 57 to the shaft 43 and this provides for adjustment of said cam 57. Arrows 53' and 54' are provided adjacent the respective switches 53 and 54 to point the direction in which the rear end portion of the vehicle will be moved when the switch adjacent the arrow is closed. If desired the arrows can be illuminated when the switch adjacent thereto is closed.

Obviously the motor 45 can be wired in such a manner that it will not run when the engine of the vehicle on which it is installed is operating, thus making it impossible to operate the parking device when the engine of the vehicle is running. Also devices can be provided in the circuit of the motor 45 for stopping said motor at the end of each complete revolution of the wheel sector 24 and when said wheel sector is in its uppermost position.

FIGS. 12 and 13 show bracket means by which my wheel sector 24 can be mounted on a differential gear housing 19a without alteration of the cap or cover 20a of said housing. This means comprises an angle bracket 65 capable of being welded to the differential housing 19a and carrying a rearwardly extending cylindrical bearing member 66. A bearing sleeve 67 having a disc shaped flange 68 is rotatively mounted on the bearing member 66. The web 25 of the wheel sector 24 is fitted over the sleeve 67 and is preferably secured to the sleeve 67 and flange 68 by welds 70 at the periphery of the flange and at the location where the web 25 fits around the sleeve 67. A universal joint bracket 46' similar to the previously described bracket 36 is rigidly secured, by welding indicated at 71, to the rear end portion of the bearing tube 67. A terminal part 66' of the bearing member 66 is of reduced diameter and is threaded and has a castle nut 72 thereon holding the wheel sector parts on bearing member 66. The lower arm of bracket 65 is fairly thin and transversely curved, FIG. 13, and does not materially reduce road clearance when welded to the lower part of housing 19a but is strong.

FIG. 14 shows another means by which my wheel sector 24 can be mounted on the cap or cover 20b of a differential gear housing 19b. This means comprises welding to the rear side of the cap or cover 20b a strong and substantial bowl shaped member 73. A strong flat disc 74 is securely welded within the bowl shaped member 73 and a cylindrical bearing member 75 is secured, preferably by welding to the disc 74 and member 73 and projects horizontally rearward from member 73 and cap 20b. A wheel sector 24 is rotatively mounted on the cylindrical bearing member 75 and is positioned close to the cap 20b rearwardly therefrom. The bearing member 75 and the axis of the wheel sector carried thereby are in the longitudinal medial vertical plane of the vehicle and below the axis of the housing. The wheel sector 24 and means for mounting it on the bearing member 75 of FIG. 14 are duplicates of those shown in FIGS. 12 and 13 and are similarly numbered.

FIG. 15 shows another means by which a wheel sector 24 can be mounted on the cap 20c of a differential gear housing 19c and further shows wheel sector driving means of modified form. Said FIG. 15 shows a cylindrical bearing member 76 extending through the wall of the cap 20c and positioned centrally of said cap 20c so that the longitudinal axis of the bearing member 76 coincides with the longitudinal axis of the housing 19c. A strong flat disc 77 is securely welded within the cap 20c and the bearing member 76 extends through said disc 77 and is welded to both the disc 77 and the wall of the cap 20c. A bearing tube 78 is rotatable on the bearing member 76 and has a disc shaped flange 79. The web 25 of the wheel sector 24 is secured to the flange 79 by a flat clamp ring 80 and cap screws 81. A washer 82 and castle nut 83 retain the bearing tube 78 on the bearing member 76.

The wheel sector 24 in FIG. 15 is similar to the previously described wheel sectors except that it may be of slightly larger diameter because the bearing member 76 on which it is mounted is positioned at a higher elevation than the previously described bearing members. The driving means for the wheel sector 24 of FIG. 15 is connected with said wheel sector at a point removed from the axis of rotation of said sector. This connection can be made by welding a short tube 84 to the clamp ring 80 and using a universal joint 85, similar to the previously described universal joint 34 shown in FIGS. 3 and 5 to connect the tube 84 with the driving shaft 35. The power from the driving shaft 35, being applied off-center but near the center of rotation of the wheel sector 24 will rotate said wheel sector 24 and the universal joint 85 together with another universal joint similar to the joint 42 of FIGS. 2, 3 and 5 at the other end of the shaft 35 will compensate for non-alignment of the several members in the driving line and for length variations in the same.

In the normal operation of a vehicle equipped with this parking device the wheel sector 24 remains in the raised position in which it is shown by full lines in FIGS. 2, 3, 4 and 5. In this position it does not reduce road clearance and will not interfere in any way with the driving of the vehicle. If the vehicle is to be parked in a short parking space, see FIG. 1, between two other vehicles and alongside of a curb C, said vehicle is headed into the parking space and brought to a stop in a position substantially as shown by full lines. The driver then closes the switch 54 at his right and operates the motor 45 in the proper direction to impart clockwise rotation, FIG. 4, to the wheel sector 24. As said wheel sector 24 is rotated it contacts the roadbed, lifts the rear end portion of the vehicle and moves said rear end portion sidewise from the position in which it is shown by full lines to the position in which it is shown by dot and dash lines and alongside of the curb. All of this is done without backing the vehicle and this makes for easier parking in heavy traffic where other vehicles are following closely. Also it can be done in a parking space of minimum length. To move the rear end portion of the vehicle out of the parking space and away from the curb C the operator closes the switch 53 and rotatively moves the wheel sector 24 in the opposite direction.

The length of the periphery of the wheel sector 24 is preferably about equal to the over-all width of the vehicle. This makes it possible to move the rear end of the vehicle into or out of a parking space by one excursion or complete revolution of the wheel sector. Obviously the vehicle can be turned a greater amount if desired by successive rotations of the wheel sector 24. The wheel sector 24 shown in FIGS. 4 and 6 is less than a semi-circle in size. Usually this wheel sector is not greatly in excess of a semi-circle in size and is not made large enough to substantially reduce road clearance of the vehicle on which it is used. The cam shaped extremities 33 of the tire member 27 help to bring about an easier and smoother lift of the vehicle at the time the wheel sector first contacts the roadbed. Said wheel sector 24 is positioned mid-way between the two sides of the vehicle and it will ordinarily lift the rear end of the vehicle evenly without tending to tilt the same.

The foregoing description and accompanying drawings clearly disclose preferred embodiments of my invention but it will be understood that changes may be made within the scope of the following claims.

I claim:

1. A parking device for a motor vehicle which has a rear axle assembly provided with a conventional differential gear housing having a spherically shaped rear end member, comprising a longitudinally extending horizontal bearing member extending from within the differential gear housing through the wall of and rearwardly of said differential gear housing rear end member; at least one rigid plate within and secured to said spherically shaped rear end member of said differential gear housing stabilizing and supporting said bearing member; a wheel sector rotatively supported by said bearing member; and wheel sector driving means carried by a part of the vehicle to the rear of said wheel sector and connected with said wheel sector.

2. A parking device for a motor vehicle which has a rear axle assembly including a medially positioned conventional differential gear housing having a rigid spherically shaped cap on its rear side, the outer wall of said cap being convex, comprising a bowl shaped support member having a concave side and positioned with its concave side against the outer convex side of said spherically shaped cap and welded to said cap; a horizontal bearing member extending through said bowl shaped support member and secured thereto; a rigid plate within said bowl shaped support member welded to and supporting the inner end portion of said bearing member; a wheel sector rotatively supported by said bearing member; and wheel sector driving means carried by a part of the vehicle to the rear of said wheel sector and connected with said wheel sector.

3. A parking device for a motor vehicle which has a rear axle assembly including a differential gear housing provided with a rigid cap on its rear side, comprising a bearing member extending through the wall of said cap and secured to said cap coaxially of said cap; a rigid plate within said cap supporting the rear end of said bearing member, the bearing member being welded to the plate and the cap; a wheel sector rotatively supported by said bearing member; power means supported by a part of said vehicle to the rear of said wheel sector; and a shaft driven by said power means and connected with said wheel sector at a point adjacent to but to one side of the bearing axis of said wheel sector.

4. A parking device for use on a motor vehicle which has a rear axle assembly including a medially positioned differential gear housing, comprising a longitudinally extending hoizontal bearing member supported from said differential gear housing; a wheel sector rotatively supported by said bearing member capable when rotated of lifting and transversely moving the rear end portion of said vehicle; wheel sector driving means carried by a part of the vehicle to the rear of said wheel sector and having a driving connection with said wheel sector; electrically actuated signal means capable of indicating the position of said wheel sector; a switch controlling the energizing of said signal means; and cam devices operated by said driving means capable of operating said switch and actuating said signal means when said wheel sector is in a predetermined elevated inoperative position.

5. A parking device for a motor vehicle which has a rear axle assembly including a conventional differential gear housing having a spherically shaped rear end member, comprising a bearing tube having a longitudinal axis disposed in the vertical longitudinal plane passing through the longitudinal axis of the vehicle and extending through the wall of said spherically shaped rear end member and into said differential gear housing and communicating with the interior of said differential gear housing and rigidly secured to said end member; a bearing member rotatively supported in said bearing tube; a wheel sector secured to said bearing member and positioned close to said spherically shaped end member, said bearing tube and bearing member receiving lubricant from within said differential housing; and wheel sector driving means carried by a part of the vehicle to the rear of said wheel sector and having a driving connection with said wheel sector.

6. The apparatus as claimed in claim 5 in which the inner end portion of the bearing tube within said spherically shaped rear end member of the differential gear housing is supported by radially positioned web members which are welded to the bearing tube and to the spherically shaped rear end member.

References Cited in the file of this patent

UNITED STATES PATENTS

| | | |
|---|---|---|
| 1,298,556 | Persson | Mar. 25, 1919 |
| 1,394,376 | Urbano | Oct. 18, 1921 |
| 1,395,111 | Hollifield | Oct. 25, 1921 |
| 1,833,288 | Hedstrom | Nov. 24, 1931 |
| 1,888,149 | Truran | Nov. 15, 1932 |
| 1,967,588 | Nickerson | July 24, 1934 |
| 2,638,995 | Gottlieb | May 19, 1953 |
| 2,685,934 | Coloma | Aug. 10, 1954 |
| 2,961,056 | Munns | Nov. 22, 1960 |

FOREIGN PATENTS

| | | |
|---|---|---|
| 417,303 | Germany | Aug. 11, 1925 |
| 336,725 | Great Britain | Oct. 23, 1930 |
| 551,143 | Canada | Jan. 7, 1958 |